United States Patent [19]

Kobayakawa et al.

[11] Patent Number: 5,557,744
[45] Date of Patent: Sep. 17, 1996

[54] MULTIPROCESSOR SYSTEM INCLUDING A TRANSFER QUEUE AND AN INTERRUPT PROCESSING UNIT FOR CONTROLLING DATA TRANSFER BETWEEN A PLURALITY OF PROCESSORS

[75] Inventors: Kazushige Kobayakawa; Shigeru Nagasawa; Masayuki Ikeda; Haruhiko Ueno; Naoki Shinjo; Teruo Utsumi; Masami Dewa; Kenichi Ishizaka, all of Kawasaki, Japan

[73] Assignee: Fujitsu Limited, Kawasaki, Japan

[21] Appl. No.: 104,482

[22] Filed: Jul. 28, 1993

[30] Foreign Application Priority Data

Dec. 18, 1992 [JP] Japan .................... 4-338470

[51] Int. Cl.[6] .................. G06F 13/24; G06F 13/00
[52] U.S. Cl. .................. 395/200.01; 395/200.15; 395/492; 395/733; 395/736; 395/859; 395/874; 395/481; 364/230.2; 364/242.2; 364/260; 364/284.4; 364/941; 364/941.4; 364/964.6; 364/931.4; 364/DIG. 1; 364/DIG. 2
[58] Field of Search .................. 395/425, 325, 395/725, 775, 800, 200, 733, 736, 737, 738, 481, 490, 492, 853, 856, 859, 872, 874, 200.01, 200.02, 200.07, 200.08, 200.13, 200.15, 200.16, 200.2, 494, 292, 308, 311; 370/85.6

[56] References Cited

U.S. PATENT DOCUMENTS 4,032,899  6/1977  Jenny et al. .................. 395/311
4,646,294  2/1987  Eliscv et al. .................. 370/85.6
4,672,570  6/1987  Benken .................. 395/200.2
5,016,221  5/1991  Hamstra .................. 365/221
5,161,215  11/1992  Kouda et al. .................. 395/250
5,369,749  11/1994  Baker et al. .................. 395/700

FOREIGN PATENT DOCUMENTS

0405545   1/1991   European Pat. Off. .
84/03192  8/1984   WIPO .

Primary Examiner—Glenn Gossage
Attorney, Agent, or Firm—Staas & Halsey

[57] ABSTRACT

A multiprocessor system having a plurality of processors connected in parallel with each other through a network for performing mutual communication. Each processor includes a transfer queue unit for storing transfer requests, a main storage, a reception unit for receiving a transfer request from another processor, and a transmission unit for sending designated data to another processor when the transfer request is enqueued in the transfer queue unit. Each processor also includes a first register for storing information indicating whether the transfer queue unit is full, i.e. has an area available for storing a transfer request, and a second register for indicating whether a transfer request is a valid transfer request during a reception operation. A save unit is connected to the reception unit for temporarily saving a transfer request, and an enqueuing unit is provided for enqueuing a transfer request from the save unit to the transfer queue unit. An interruption processing unit receives an interrupt request from the reception unit, supervises the vacant/full state of the transfer queue unit, i.e. monitors whether the transfer queue unit has an area available for storing a transfer request, and outputs an enqueuing request to the enqueuing unit to realize the interrupt request.

8 Claims, 6 Drawing Sheets

MULTIPROCESSOR SYSTEM INCLUDING A TRANSFER QUEUE AND AN INTERRUPT PROCESSING UNIT FOR CONTROLLING DATA TRANSFER BETWEEN A PLURALITY OF PROCESSORS

BACKGROUND OF THE INVENTION

1. Field of the Invention

The present invention relates to a multiprocessor system formed of a plurality of processors connected in parallel with each other through a network. The processor includes electrical hardware to perform communication between processors. Particularly, in the present invention, a multiprocessor system can manage a communication process on the hardware by using an operating system (OS) or a data processing program.

2. Description of the Related Art

In a multiprocessor system, each processor has hardware, for example, a transmission unit and a reception unit, to perform communication between processors. During communication between processors, it is necessary to build up hardware enabling certain transfer of data, and enabling suitable management of the communication process for a transfer request by using an operating system (OS) or a data processing program.

A suitable management system using an operating system and a data processing program has not yet been realized in the conventional art.

SUMMARY OF THE INVENTION

The object of the present invention is to provide a multiprocessor system enabling a certain communication process, for example, passing a request for transferring data (below, a transfer request) and transferring data, between processors by using an operating system or a data processing program.

In accordance with the present invention, there is provided a multiprocessor system having a plurality of processors connected in parallel with each other through a network for performing communication, each processor including:

a transfer queue unit for temporarily storing a plurality of transfer requests; a main storage for storing data to be enqueued; a reception unit connected to the transfer queue unit for receiving transfer requests issued by another processor in the multiprocessor system, and sequentially enqueuing the transfer requests to the transfer queue unit; a transmission unit connected to the transfer queue unit for sending data designated by a transfer request from the main storage the another processor in the multiprocessor system when the transfer request is enqueued in the transfer queue unit; a first register connected to the reception unit for indicating whether the transfer queue unit has an area available for storing transfer request; a second register connected to the reception unit for indicating whether a transfer request is a valid transfer request information during the reception operation at the reception unit; a save unit connected to the reception unit for temporarily saving a transfer request; an enqueuing unit connected between the save unit and the transfer queue unit for enqueuing the transfer request from the save unit to the transfer queue unit; and an interruption processing unit connected to the reception unit and the first register for receiving an interruption request from the reception unit, monitoring whether the transfer queue unit has an area available for storing a transfer request and outputting an enqueuing request to the enqueuing unit when the transfer queue means has an area available for storing a transfer request to realize the interruption request.

In one preferred embodiment, the multiprocessor system further includes a write pointer (register) connected between the transfer queue unit and the transmission unit and incremented by the reception unit for indicating a next available area to be written in the transfer queue unit, and a read pointer (register) connected between the transfer queue unit and the transmission unit and incremented by the transmission unit for indicating an area to be read from the transfer queue unit.

In another preferred embodiment, the interruption processing unit includes one of an operating system and a data processing program.

In still another preferred embodiment, the reception unit includes a rejection unit for ignoring the transfer request sent from another processor, a decision unit for determining whether the first register indicates the transfer queue unit does not have an area for storing a transfer request when receiving the transfer request, a detection unit for detecting whether the transfer queue unit has an area available when the first register indicates a vacant state, a save unit for saving the transfer request into the save unit when the decision unit determines the first register indicates the transfer queue unit does not have an area available and when the detection unit detects the transfer queue unit does not have an area available, and an issuing unit for issuing an interruption request to the interruption processing unit when the save unit saves the transfer request into the save unit.

In still another preferred embodiment, when an interruption processing unit receives the interruption request from the issuing unit, the interruption processing unit detects whether the transfer queue unit has an area available for storing a transfer request and when an area is available issues an enqueuing request to the enqueuing unit so as to enqueue the transfer request to the transfer queue unit.

In still another preferred embodiment, the interruption processing unit sets the first register regardless of the state of the transfer queue unit.

In still another preferred embodiment, the interruption processing unit sets the second register and the reception unit ignores a transfer request when the second register indicates a non-valid transfer request.

In still another preferred embodiment, the transfer queue unit enqueues a transfer request issued by the processor containing the transfer queue unit.

DESCRIPTION OF THE PREFERRED EMBODIMENTS

Before describing the preferred embodiments, a conventional structure and its problems will be explained in detail hereinafter.

Figure 1:
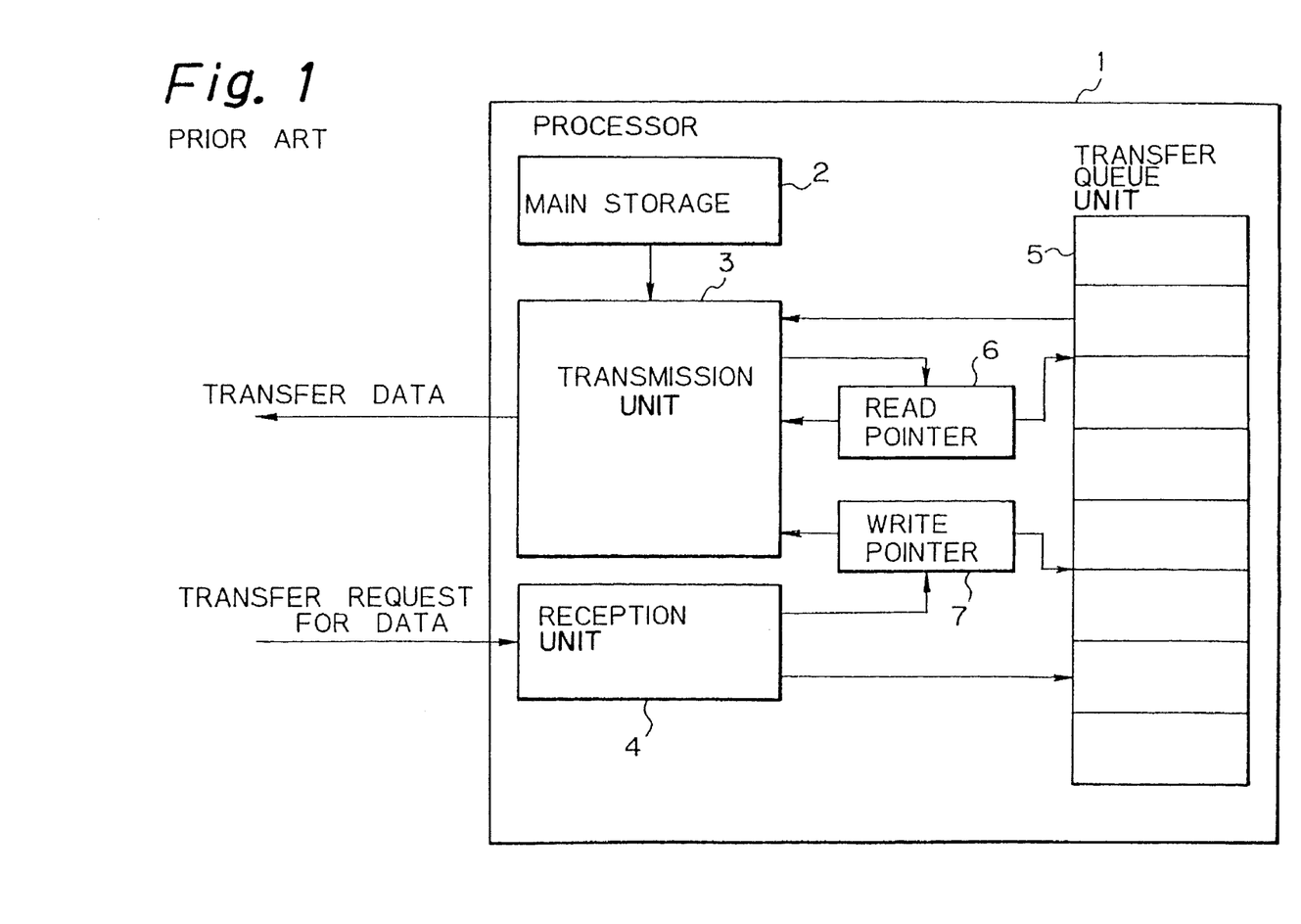
FIG. 1 is a schematic block diagram of a conventional basic structure provided in a processor for performing communication between a plurality of processors.

FIG. 1 is a schematic block diagram of a conventional basic structure provided in a processor for performing communication between processors. In FIG. 1, reference number 1 denotes a processor used in a multiprocessor system, reference number 2 denotes a main storage, reference number 3 denotes a transmission means or unit formed of hardware for a transferring data, reference number 4 denotes a reception means or unit, also formed of a hardware for receiving a transfer request, reference number 5 denotes transfer queue means or unit, reference number 6 denotes a read pointer, and reference number 7 denotes a write pointer.

In the processor 1, when the transfer request is sent from another processor to the reception unit 4, the reception unit 4 receives the transfer request and enqueues it into the transfer queue unit 5. Further, the reception unit 4 increments a content of the write pointer 7, which indicates a destination, i.e. address, to be enqueued next in the transfer queue unit 5, by "1".

The transmission unit 3 always supervises the values of the read pointer 6 and the write pointer 7. When the pointer 6 indicates a different value compared to the write pointer 7, data which has not yet been transferred from the main storage 2 exists. Accordingly, the transmission unit 3 reads the data, designated by the transfer request stored at the destination pointed at by read pointer 6, from the main storage 2, and transfers the data to the processor designated by the transfer request. When the transmission unit 3 completes the above transfer process of the data, the transmission unit 4 increments the content of the read pointer 6, which indicates a destination, i.e. address, to be read from the transfer queue means 5, by "1".

In the above transfer process of the data, when a number of transfer requests exceeding the number of requests previously expected, is issued from other processors, the transfer queue unit 5 reaches an overflow state. When an overflow state occurs in the transfer queue unit 5, the reception unit 4 can not receive a subsequent transfer request, and the reception unit 4 ignores the subsequent transfer request.

As explained above, the conventional processor employs a structure in which the transmission/reception units 3 and 4, each of which is formed of hardware, perform a data transferring process for a transfer request sent from another processor, regardless of an operating system or a data transfer program.

There are, however, problems in the conventional art. That is, as mentioned above, when many transfer requests, which exceed the number of requests previously expected, are issued from other processors, the transfer queue unit 5 reaches an overflow state so that the reception unit 4 cannot handle the transfer requests to be processed.

Further, since the transmission/reception units 3 and 4 perform the data transferring process for the transfer request regardless of the operating system and the data transfer program, the operating system and the data transfer program, the operating system and the data transfer program cannot detect a frequency of the issue of the transfer requests from other processor so that they cannot control the reception of the transfer request sent from other processors.

Accordingly, the present invention aims to realize a multiprocessor system which can manage a communication process, particularly reception of a transfer request and the transfer of data based on the transfer request, in hardware, i.e., both transmission/reception units 3 and 4, by using an operating system or a data processing program.

Figure 2:
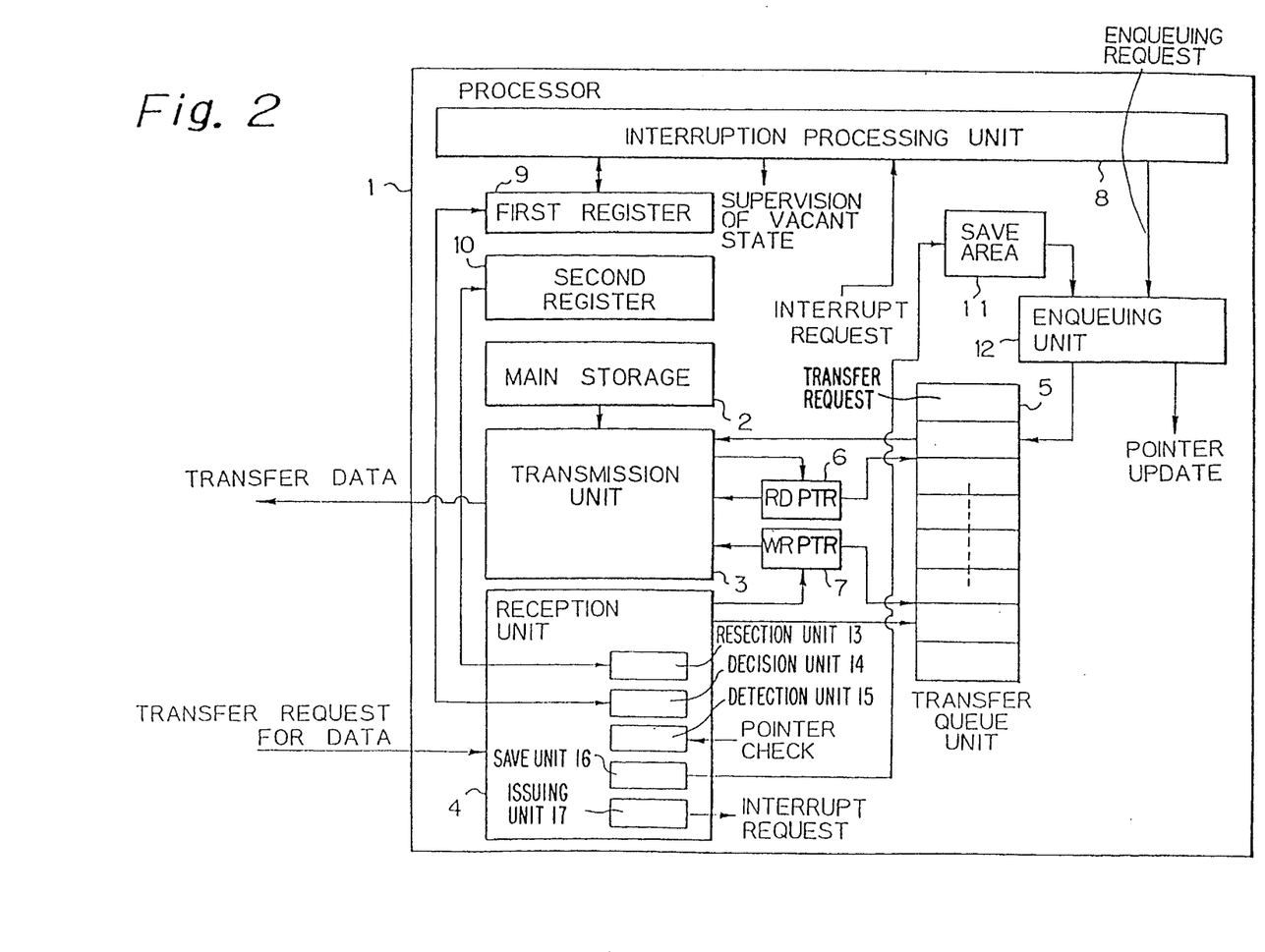
FIG. 2 is a schematic block diagram of a basic structure of a processor for performing communication between a plurality of processors according to the present invention.

FIG. 2 is a schematic block diagram of a structure provided in a processor for performing communication between processors according to the present invention. The same reference numbers as used in FIG. 1 are attached to the same components in this drawing. According to the present invention, a transfer request, issued by a data processing program from its own processor 1, may be enqueued in the transfer queue unit 5.

In FIG. 2, reference number 8 denotes an interruption processing unit formed of, for example, a supervisor. A supervisor is one kind of operating system OS. When the interruption processing unit 8 receives an interruption request, it performs an interruption process in accordance with the interruption request. Reference number 9 denotes a first register provided for managing (indicating) whether the transfer queue unit 5 reaches a fully enqueued state. Reference number 10 denotes a second register provided for managing (indicating) valid information at the reception operation which is set by the interruption processing unit 8. Reference number 11 denotes a save area provided for saving the transfer request received by the reception unit 4. Reference number 12 denotes an enqueuing unit provided for enqueuing the transfer request, which is saved in the save area 11, in the transfer queue unit 5.

As shown in the drawing, the reception unit 4, according to the present invention, comprises a rejection unit 13 for ignoring the transfer request sent from another processor; a decision unit 14 for determining whether the first register 9 indicates a fully enqueued state of the transfer queue unit 5; a detection unit 15 for detecting whether the transfer queue unit 5 has been filled with a particular transfer request; a save unit 16 for saving the received transfer request to the save area 11; and an issuing unit 17 for issuing the interruption request to the interruption processing unit 8.

The operation of the processor 1 shown in FIG. 2 will be explained briefly below.

When a transfer request is sent from another processor, the rejection unit 13 of the reception unit 4 ignores the transfer request when the second register 10 indicates a "non-validity" (i.e., an invalidity) upon a reception operation, i.e. the reception of a transfer request. Accordingly, the interruption processing unit 8 can ignore a transfer request issued by another processor when the interruption processing unit 8 sets the information indicating the non-validity, upon the reception operation, in the second register 10.

When the second register 10 indicates the validity of the reception operation, the decision unit 14 determines whether the first register 9 indicates a full state. When the decision unit 14 determines that the first register 9 indicates a full state, the save unit 16 saves the transfer request to the save area 11. Further, the issuing unit 17 issues an interruption request to the interruption processing unit 8.

When the interruption processing unit 8 receives the interruption request, it determines that the interruption request is caused by the full state of the transfer queue unit 5, in accordance with the management data at the first register 9. The interruption processing unit 8 then supervises the contents of the read pointer 6 and the write pointer 7 to detect a vacant area for the transfer request in the transfer queue unit 5. The interruption processing unit 8 then issues an enqueuing request to the enqueuing unit 12 when the transfer queue unit 5 has a vacant area. When the enqueuing unit 12 receives the enqueuing request from the interruption processing unit 8, the enqueuing unit 12 enqueues the transfer request, which is saved in the save area 11, into the transfer queue unit 5, and increments the content in the write pointer 7 by "1".

When the decision unit 14 determines that the first register 9 indicates a non-full state, the detection unit 15 detects whether or not the transfer queue unit 5 has reached the full state, in accordance with the contents of the read pointer 6 and the write pointer 7. When the detection unit 15 detects the full state of the transfer queue unit 5, the detection unit 15 sets the indication of the full state into the register 9. Further, the save unit 16 saves the transfer request to the save area 11, and the issue unit 17 issues an interruption request to the interruption processing unit 8.

As explained above, according to the present invention, when reception unit 4 receives the transfer request from another processor, the transfer request is temporarily saved in the save area when the transfer queue unit 5 is full. Further, when the operating system detects a vacant area in the transfer queue unit 5, the transfer request is enqueued in the transfer queue unit 5. Accordingly, if the transfer queue unit 5 is full, a transfer request from another processor is not ignored in the present invention.

Further, the management data in the first register 9 is set to the indication of the full state when the reception unit 4 detects the full state of the transfer queue unit 5. The indication of the full state is reset when the full state of the transfer queue 5 is released after the data transfer is completed in the transmission unit 3. In this case, when the interruption processing unit 8 sets the indication of the full state into the first register 9, regardless of the full state of the transfer queue unit 5, the interruption request is sent to the interruption processing unit 8 so that the interruption processing unit 8 can detect the frequency of the issue of the transfer requests sent from other processors in the present invention.

Figure 3:
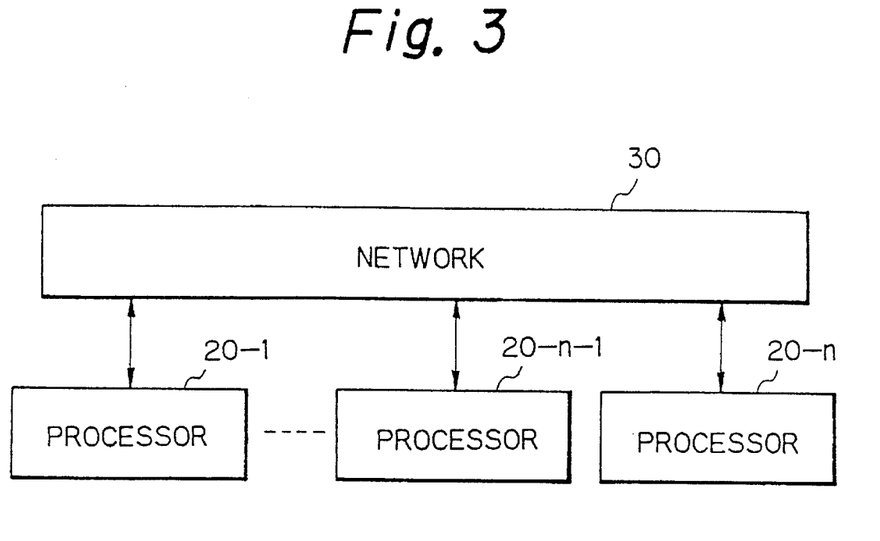
FIG. 3 is a schematic block diagram of a multiprocessor system using the present invention.
Figure 4:
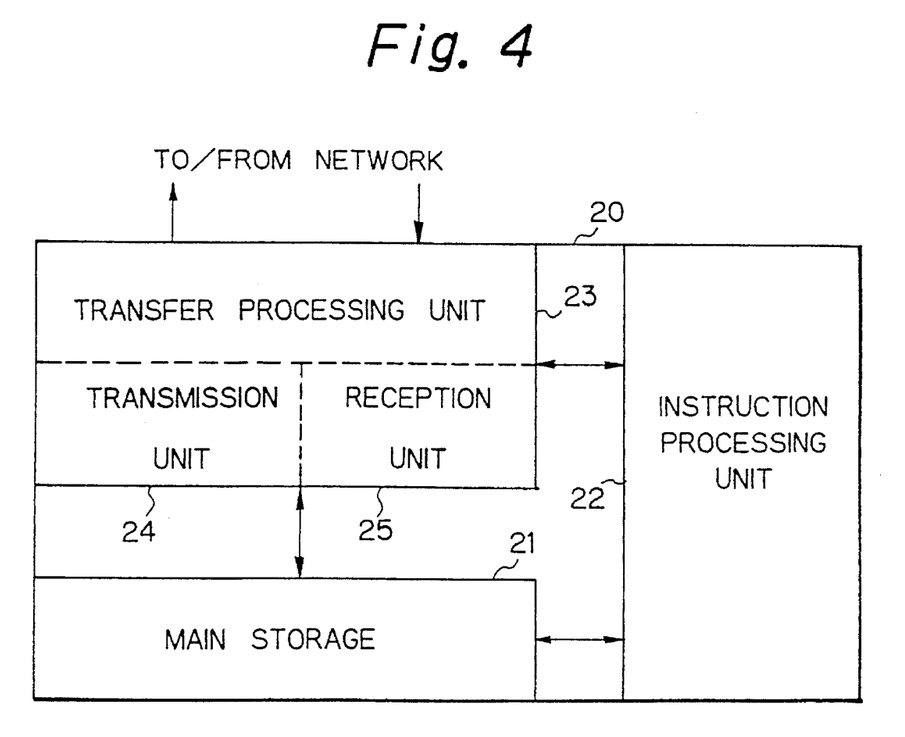
FIG. 4 is a schematic block diagram of a processor as shown in FIG. 3.

FIG. 3 is a schematic block diagram of a multiprocessor system using the present invention, and FIG. 4 is a schematic block diagram of a processor shown in FIG. 3. In FIG. 3, reference numbers 20-1 to 20-n denote processors, and reference number 30 denotes a network connecting in parallel the plurality of processors 20-1 to 20-n. Each processor 20 corresponds to the processor 1 shown in FIG. 2.

As shown in FIG. 4, the processor 20 includes a main storage 21 for storing instructions and data, an instruction processing unit 22 for moving an instruction from the main storage 21 and executing the instruction, and a transfer processing unit 23 for transferring data packets between the main storage 21 and the network 30. Further, the transfer processing unit 23 includes a transmission unit 24 for transferring the data packets, and a reception unit 25 for receiving the data packets.

In this case, the interruption processing unit 8, shown in FIG. 2, is included in the instruction processing unit 22. Further, the transfer request to the reception unit 4 and the data transfer from the transmission unit 3 corresponds to arrow lines between the processors and the network in FIGS. 3 and 4. Although the transfer processing unit 23 of FIG. 4 is not shown in FIG. 2, this unit 23 includes the transmission unit 3 and the reception unit 4.

Figure 5:
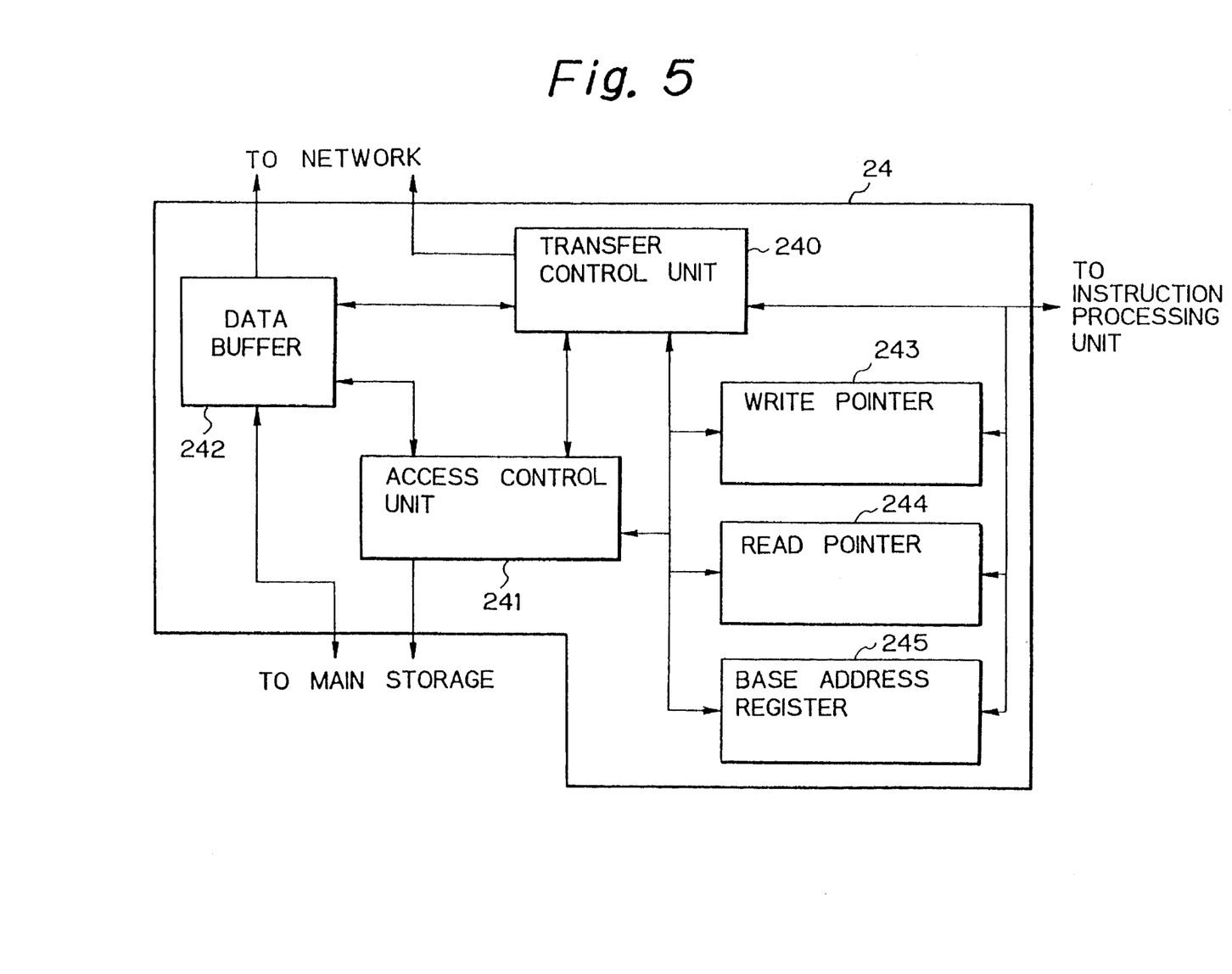
FIG. 5 is a detailed block diagram of the transmission unit shown in FIG. 4.
Figure 6:
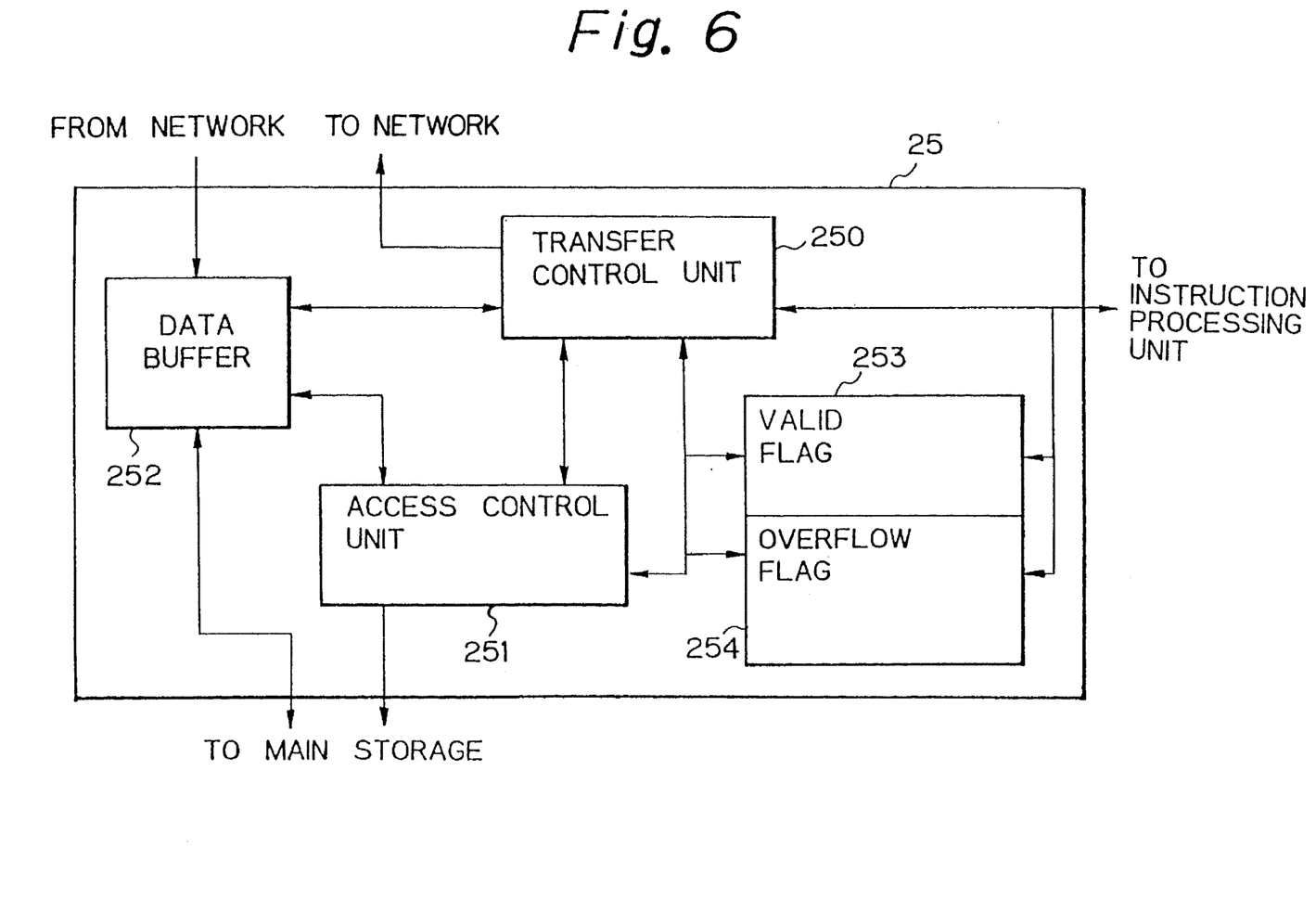
FIG. 6 is a detailed block diagram of the reception unit shown in FIG. 4.

FIG. 5 is a detailed block diagram of the transmission unit shown in FIG. 4, and FIG. 6 is a detailed block diagram of the reception unit shown in FIG. 4.

The transmission unit 24 is formed of a transfer control unit 240 for the network, an access control unit 241 for the main storage (also referred to as main memory), a data buffer 242, a write pointer 243 for the transfer queue unit 5, a read pointer 244 for the transfer queue unit 5, and a base address register 245 for the transfer queue unit 5.

The transfer control unit 240 is started by an instruction from the instruction processing unit 22 of FIG. 4, and starts to transfer the data in accordance with values in the write pointer 243 and the read pointer 244. Further, the transfer control unit 240 issues an access request to the main storage to the access control unit 241 to read a header and a body data of a transfer packet, and controls a network interface (not shown) to control the data transfer from the data buffer 242 to the network 30 (shown in FIG. 3).

The access control unit 241 executes an access operation to the main storage 21 in accordance with an instruction from the transfer control unit 240. The data buffer 242 temporarily stores the data when transferring the data between the main storage 21 and the network 30, and stores data required for a read/write operation of data on the main storage 21.

The write pointer 243 is a register which is able to refer to and update the data from the instruction processing unit 22, and indicates the state that the transfer request is enqueued in the transfer queue unit 5. The read pointer 244 is also a register which is able to refer to and update data from the instruction processing unit 22, and indicates the state that the transfer process of the data is completed in the transfer queue unit 5. The base address register 245 is also a register which is able to refer to and update the data from the instruction processing unit 22, and indicates a head address of the transfer queue in the main storage 21.

There are two types of transfer requests to be enqueued by the transfer queue unit 5, one is generated by the data processing program in its own processor 20, and the other is sent from another processor 20. The latter is enqueued from the reception processing unit 25 to the transfer queue unit 5, as explained below.

When the transfer request, which instructs the transfer of the data that its own processor 20 has, is enqueued in the transfer queue unit 5, the data processing program writes various information, for example, a designation of the reception apparatus, a length of body data, a transmission address, and reception address, onto the main storage 21. In this case, the location on the main storage 21 is addressed by the following formula, i.e., "base address of the transfer queue+an indication of the write pointer×a length of the header".

Further, the above information is written in accordance with a form of a packet header.

After the above operation, the write pointer 243 is incremented by "1". The data processing program repeats above process when it enqueues the transfer request in the transfer queue unit 5.

On the other hand, when the transfer request, which instructs the transfer of the data that another processor 20 has (below, this type of the packet for the transfer request may be called a read request packet), is enqueued in the transfer queue unit 5, the data processing program writes various information from another processor (below, this type of the processor may be called a data returning processor), for example, a designation of the reception apparatus, a length of body data, a transmission address, and reception address, onto the main storage 21 in accordance with a form of the packet header.

Next, the data processing program writes information, for example, a designation of the reception apparatus of the data returning processor, a transmission address in which a returning packet header is written, and a control information indicating a read request packet, onto the main storage 21. In this case, the location on the main storage 21 is addressed by the following formula, i.e., "base address of the transfer queue+an indication of the write pointer×a length of the header".

Further, the above information is written in accordance with a form of the packet header.

Still further, after above operation, the write pointer 243 is incremented by "1". The data processing program repeats above processes when it enqueues the read request packet to the transfer queue means 5.

Figure 7:
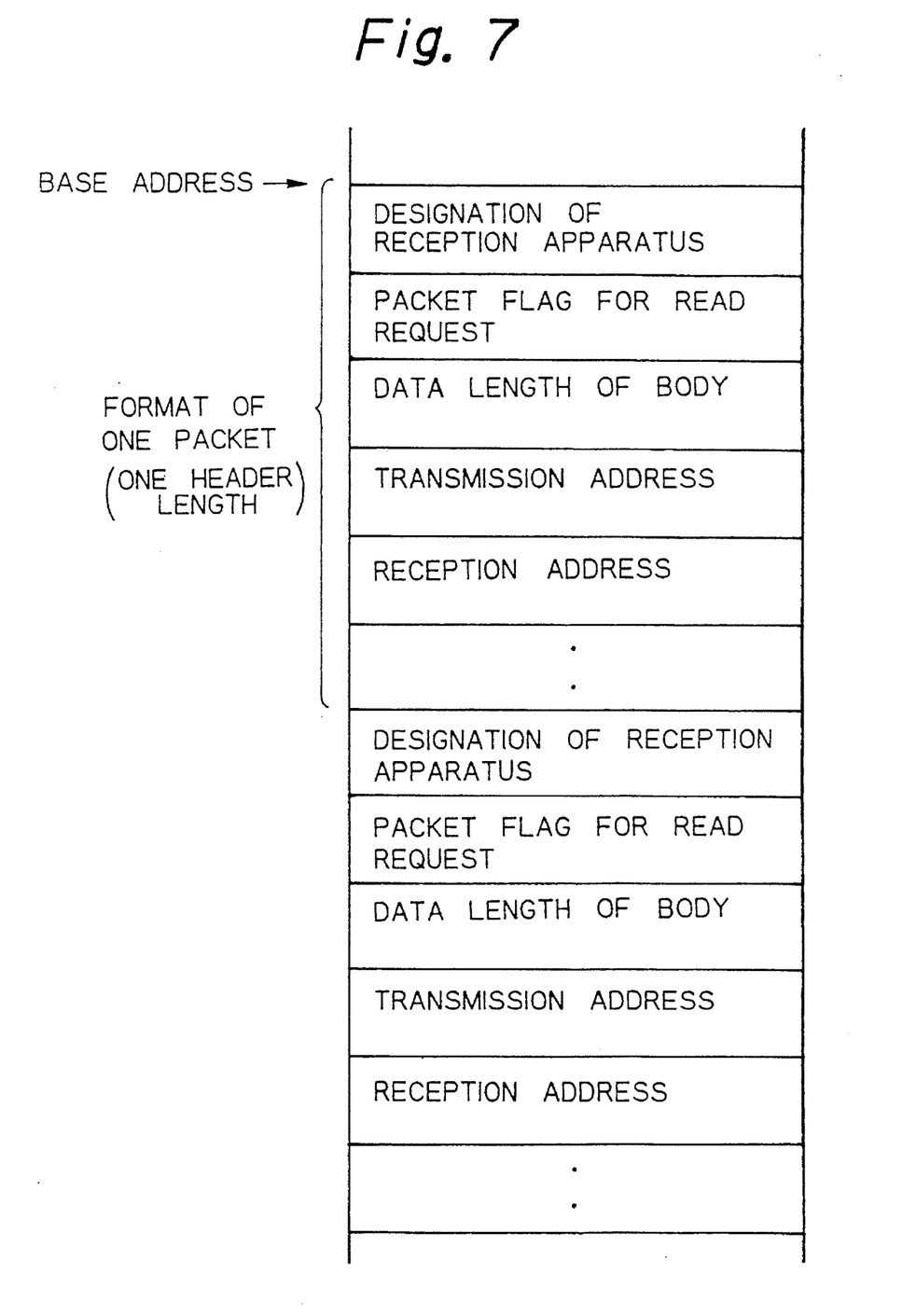
FIG. 7 is one example of data structure of transfer queue means according to the present invention.

FIG. 7 is one example of a data structure of the transfer queue unit 5 according to the present invention. The format of one packet contains a destination of a reception apparatus, a packet flag for a read request, a data length of a body, a transmission address, a reception address, etc.

In accordance with the packet flag for the read request, it is possible to distinguish whether the transfer request enqueued in the transfer queue unit 5 indicates the transfer request for data which own processor 20 has, or the transfer request for the data which another processor 20 has.

Next, the operation of the transmission unit 24 will be explained in detail below with reference to FIG. 5.

First, the transfer control unit 240 of the transmission unit 24 is started by the instruction processing unit 22, and waits for the enqueuing operation of the transfer request to the transfer queue unit 5. When the content of the write pointer 243 does not coincide with the content of the read pointer 244, the transfer control unit 240 determines that there are transfer requests which have not yet been handled, and starts the data transfer process. Further, the transfer control unit 240 issues an access request to the access control unit 241 to read the header of the transfer packet to be transferred.

When the access control unit 241 receives the access request, the access control unit 241 calculates the main memory address of the transfer request, which is the oldest and not yet answered request, in accordance with the base address register 245 and the read pointer 244, and issues a read access request to the main storage 21 by designating the main memory address. Further, when the packet header is read from the main memory 21, in response to the above operation, it is stored in the data buffer 242. When the read of the packet header is completed, the completion is informed to the transfer control unit 240.

Further, the access control unit 241 removes the control information for the transfer request from the data buffer 242, calculates the address of the packet body of the packet to be transferred, designates the main memory address, and issues the read access instruction to the main memory 21.

When the packet bodies are read from the main memory 21 in response to the above instruction, the packet bodies are sequentially stored in the data buffer 242, and the number of packet bodies, which is read out from the main storage 21, is sequentially sent to the transfer control unit 240.

Still further, when the access control unit 241 informs the transfer control unit 240 of the completion of the read operation for the packet header. The transfer control unit 240 removes the control information for the transfer request from the data buffer 242, and returns the control information to the data buffer 242, after performing a predetermined test and check on the data. Then, the transfer control unit 240 sends the packet header from the data buffer 242 to the network 30. Further, an amount of read of the packet bodies are informed from the access control unit 241, and the packet bodies, which are stored in the data buffer 242, are sent sequentially to the network 30.

When the transfer control unit 240 completes the transfer of the packets to the network 30, the transfer control unit 240 increments the read pointer 244 by "1". Further, the transfer control unit 240 checks the contents of the write pointer 243 and the read pointer 244. When there are transfer requests which have not yet been handled, the transfer control unit 240 starts to process the next transfer of data, and repeats the above processes until the content of the write pointer 243 is coincident with that of the read pointer 244.

When the transfer request indicates a read request, i.e. a packet stored by another processor, the same processes as above are performed for the data transfer. In this case, the returning packet header is transferred as the packet body. As explained above, the transmission unit 24 can perform the transfer processes regardless of the supervisor of the operating system and the data processing program.

As shown in FIG. 6, the reception unit 25 is formed of a transfer control unit 250, an access control unit 251, a data buffer 252, a valid flag 253 for the enqueue, and an overflow flag for the transfer queue 254.

The transfer control unit 250 is started in response to an instruction from the instruction processing unit 22 of FIG. 4, and determines the format of the reception of the transfer packet by referring to the valid flag 253 and the overflow flag 254. The transfer control unit 250 issues the access request for the main memory to the access control unit 251 in order to write the header and body data of the received transfer packet, and controls the reception of the data by controlling the network interface.

The access control unit 251 performs the access operation to the main memory 21 in accordance with the instruction from the transfer control unit 250, and controls the data transfer between the data buffer 252 and the main memory 21. The data buffer 252 temporarily executes a buffering operation of the data when it performs the data transfer between the network 30 and the main memory 21, and further executes a buffering operation of the data which is required in the read of data on the main memory 21.

The valid flag 253 for the enqueue is held in the register which is able to refer and update the data from the instruction processing unit 22, and indicates whether the transfer packet should be received. The overflow flag 254 is held in the register which is able to refer to and update the data from the instruction processing unit 22, and indicates whether the transfer queue unit 5 has reached an overflow state.

The operation in the reception unit 25 will be explained in detail below.

When the transfer control unit 250 is started by the instruction processing unit 22, it waits for an arrival of the transfer packet. When the transfer packet arrives at the transfer control unit 250, the transfer control unit 250 determines whether the transfer packet indicates a packet for a read request, based on the control information of the transfer packet. When it indicates the packet for the read request, i.e., when it is a transfer request from another processor, the transfer control unit 250 refers to the valid flag 253. The transfer control unit 250 ignores the packet for the read request when the valid flag 253 indicates an invalid mode. In this case, the transfer control unit 250 does not perform the enqueuing operation to the transfer queue, and does not issue the interruption for the overflow of the transfer queue.

When the valid flag 253 indicates a valid mode, the transfer control unit 250 refers to the overflow flag 254. When the overflow flag 254 does not indicate the overflow state, the transfer control unit 250 refers to the write pointer 243 and the base address 245 of the transmission unit 24, and calculates the following formula for the main address, i.e., "base address of transfer queue+write pointer×length of header".

Further, the transfer control unit 250 designates the main memory address and instructs that the access control unit 251 writes the return packet header, which is sent as the packet body of the read request, into the main memory 21.

When the access control unit 251 receives the main memory access instruction, the access control unit 251 writes the return packet header to the position of the address on the main memory 21 in accordance with the format of the packet header, and executes the enqueue operation to the transfer queue unit 5. As a result, the transfer control unit 250 increments the content of the write pointer 243 by "1".

At that time, when the transfer queue unit 5 does not indicate the overflow state, the overflow flag 254 is set to the state which does not indicate the overflow state (i.e., a non-overflow state). On the contrary, when the transfer queue means indicates the overflow state, the overflow flag 254 is updated to the indication of an overflow state, and the overflow interruption of the transfer queue is issued to the supervisor.

Further, when the valid flag 253 for the enqueue indicates the valid mode, and when the overflow flag 254 indicates an overflow state, the transfer control unit 250 temporarily saves the return packet header of the read request packet into another memory area which is separately provided from the transfer queue unit 5, and issues the overflow interruption to the supervisor of the operating system.

When the supervisor receives the overflow interruption, the supervisor performs a polling operation to detect a vacant state in the transfer queue unit 5. When the supervisor detects the vacant state in the transfer queue unit 5, the supervisor issues the enqueuing request to the enqueuing unit 12 shown in FIG. 2. When the enqueuing unit 12 receives the enqueuing request, the enqueuing unit 12 writes the return packet header of the read request packet into the position of the address on the main memory. In this case, the address of the main memory is expressed by the following formula, i.e., "base address for transfer queue+write pointer×length of header", and this is written by the format of the packet header to enqueue into the transfer queue unit 5. Further, the pointer of the 243 is incremented by "1", and the overflow flag 254 is changed to the indication that the overflow is not performed. Accordingly, the reception unit 24 can perform the reception process issued by another processor 20.

We claim:

1. A multiprocessor system formed of a plurality of processors connected in parallel with each other through a network for performing communication, each processor comprises:

transfer queue means for temporarily storing a plurality of transfer requests;

a main storage for storing data to be enqueued;

reception means queue means for receiving transfer requests issued by other processors in the multiprocessor system, and sequentially enqueuing the received transfer requests to the transfer queue means;

transmission means connected to the transfer queue means for sending data designated by a transfer request from the main storage to another processor in the multiprocessor system when that transfer request is enqueued in the transfer queue means;

a first register connected to the reception means for indicating whether the transfer queue means has an area available for storing a transfer request;

a second register connected to the reception means for indicating whether a transfer request is a valid transfer request;

save means connected to the reception means for temporarily saving a transfer request;

enqueuing means connected between the save means and the transfer queue means for enqueuing a transfer request saved by the save means to the transfer queue means; and interruption processing means connected to the reception means and the first register for receiving an interrupt request from the reception means, monitoring whether the transfer queue means has an area available for storing a transfer request and outputting an enqueuing request to the enqueuing means when the transfer queue means has an area available for storing a transfer request.

2. A multiprocessor system as claimed in claim 1, further comprising a write pointer connected between the transfer queue means and the transmission means and incremented by the reception means for indicating an available area to be written in the transfer queue means, and a read pointer connected between the transfer queue means and the transmission means and incremented by the transmission means for indicating an area to be read from the transfer queue means.

3. A multiprocessor system as claimed in claim 1, wherein the interruption processing means comprises one of an operating system and a data processing program.

4. A multiprocessor system as claimed in claim 1, wherein the interruption processing means sets the first register within the processor containing that transfer queue means to indicate that the transfer queue means does not have an area available for storing a transfer request regardless of the state of the transfer queue means.

5. A multiprocessor system as claimed in claim 1, wherein the interruption processing means sets the second register within the processor containing that transfer queue means to indicate that the transfer request is a valid request and the reception means ignores a transfer request when the second register indicates a non-valid transfer request.

6. A multiprocessor system as claimed in claim 1, wherein the transfer queue means enqueues a transfer request issued by the processor containing that transfer queue means.

7. A multiprocessor system as claimed in claim 1, wherein the reception means includes a rejection unit for ignoring a transfer request sent from another processor, a decision unit for determining whether the first register indicates the transfer queue means does not have an available area for storing a transfer request when receiving the transfer request sent from another processor, a detection unit for detecting whether the transfer queue means has an area available for storing a transfer request when the first register indicates a vacant state, a save unit for saving the transfer request sent from another processor into the save means when the decision unit determines the first register indicates the transfer queue means does not have an area available for storing a transfer request and when the detection unit detects the transfer queue means does not have an area available for storing a transfer request, and an issuing unit for issuing an interrupt request to the interruption processing means when the save unit saves the transfer request sent from another processor into the save means.

8. A multiprocessor system as claimed in claim 7, wherein, when the interruption processing means receives the interrupt request from the issuing unit, the interruption processing means detects whether the transfer queue means has an area available for storing a transfer request and, when an area is available for storing a transfer request issues an enqueuing request to the enqueuing means so as to enqueue the transfer request sent from another processor to the transfer queue means.

* * * * *